United States Patent [19]

Miyawaki et al.

[11] Patent Number: 4,853,919
[45] Date of Patent: Aug. 1, 1989

[54] INFORMATION PROCESSING APPARATUS IN WHICH A DEFLECTED LIGHT AND O-ORDER LIGHT ARE RESPECTIVELY USED FOR INFORMATION RECORDING/REPRODUCTION AND TRACKING, AND A METHOD THEREFOR

[75] Inventors: Mamoru Miyawaki, Tokyo; Kazuya Matsumoto, Yokohama, both of Japan

[73] Assignee: Canon Kabushiki Kaisha, Tokyo, Japan

[21] Appl. No.: 144,686

[22] Filed: Jan. 13, 1988

Related U.S. Application Data

[63] Continuation of Ser. No. 651,780, Sep. 18, 1984, abandoned.

[30] Foreign Application Priority Data

Sep. 22, 1983 [JP] Japan .................. 58-175376

[51] Int. Cl.$^4$ .............................................. G11B 7/09
[52] U.S. Cl. ........................................ 369/46; 369/44; 369/112
[58] Field of Search .................. 350/96.13, 96.14, 358; 356/398; 369/43–46, 109, 120, 112; 360/97

[56] References Cited

U.S. PATENT DOCUMENTS

| | | |
|---|---|---|
| 3,877,784 | 4/1975 | Lin . |
| 3,963,862 | 6/1976 | Bouwhuis .................. 369/46 X |
| 4,094,583 | 6/1978 | Kondo et al. .................. 350/358 |
| 4,135,083 | 1/1979 | Van Alem et al. .................. 250/201 |
| 4,290,122 | 9/1981 | Bates et al. .................. 360/97 X |
| 4,349,901 | 9/1982 | Howe .................. 369/45 |
| 4,425,023 | 1/1984 | Matsumoto et al. .................. 369/122 X |
| 4,449,215 | 5/1984 | Reno .................. 369/111 |
| 4,459,690 | 7/1984 | Corsouer et al. .................. 369/44 |
| 4,462,095 | 7/1984 | Chen .................. 369/44 |
| 4,470,661 | 9/1984 | Matsumoto .................. 350/358 X |
| 4,539,665 | 9/1985 | Iso et al. .................. 369/46 X |
| 4,546,460 | 10/1985 | Ando .................. 369/46 X |
| 4,635,243 | 1/1987 | Tateoka .................. 369/44 |
| 4,667,316 | 5/1987 | Suda et al. .................. 369/44 |
| 4,695,992 | 9/1987 | Aoi .................. 369/46 |
| 4,700,335 | 10/1987 | Aoi .................. 369/44 |
| 4,712,206 | 12/1987 | Kanda .................. 369/46 |

FOREIGN PATENT DOCUMENTS

| | | |
|---|---|---|
| 3227654 | 2/1983 | Fed. Rep. of Germany . |
| 59-79441 | 5/1984 | Japan . |
| 59-107431 | 6/1984 | Japan . |
| 2151355 | 7/1986 | United Kingdom . |

*Primary Examiner*—Alan Faber
*Assistant Examiner*—W. R. Young
*Attorney, Agent, or Firm*—Fitzpatrick, Cella, Harper & Scinto

[57] ABSTRACT

This specification discloses an information processing method and apparatus in which light deflected by diffraction is caused to arrive at the surface of a recording medium and when recording or reproduction of information is to be effected by effecting focus control or tracking control of the deflected light on the surface of the recording medium by the utilization of the O-order light in the diffraction, the deflected light can be moved at a high speed on the recording medium and accurate focus or tracking control of the deflected light is possible.

8 Claims, 9 Drawing Sheets

INFORMATION PROCESSING APPARATUS IN WHICH A DEFLECTED LIGHT AND O-ORDER LIGHT ARE RESPECTIVELY USED FOR INFORMATION RECORDING/REPRODUCTION AND TRACKING, AND A METHOD THEREFOR

This application is a continuation, of application Ser. No. 651,780 filed Sept. 18, 1984, now abandoned.

BACKGROUND INVENTION

1. Field of the Invention

This invention relates to an information processing method whereby a light is applied to a recording medium and information is recorded on the recording medium or the information recorded on the recording medium is reproduced and to an information processing apparatus used for such recording or such reproduction or both.

2. Description of the Prior Art

In recent years, along with the advance of information technology, optical information processing apparatuses in which light is converged on the surface of a recording medium and information is recorded or reproduced have been attracting attention. In such information processing apparatuses, there is generally provided light scanning means for scanning the converged light on the surface of the recording medium. Heretofore, mechanical light deflecting means such as a galvano mirror or the like has been used as such light scanning means, wherein this has suffered from a disadvantage that the scanning speed is low. Therefore, it would occur to mind to use the light deflector utilizing diffraction proposed in U.S. Pat. No. 4,425,02, etc., instead of said mechanical light deflecting means. An example of the information processing apparatus using such a light deflector will hereinafter be described by reference to FIGS. 1A and 1B of the accompanying drawings.

FIG. 1A shows the construction of the information reproducing apparatus according to the prior art. In FIG. 1A, reference numeral 1 designates a thin film type light deflector utilizing the diffraction of light by an elastic surface wave, reference numeral 2 denotes a beam splitter, reference numeral 3 designates an objective lens, reference numeral 4 denotes a condensing lens, reference numeral 5 designates a photodetector, and reference numeral 6 denotes a recording medium. The light deflector 1 is constructed as shown, for example, in FIG. 1B. On a substrate 11, there is formed a waveguide layer 12 having a refractive index higher than that of the substrate 11, and incident light 15 is directed into the waveguide layer 12 through a prism coupler 14. Part of the incident light propagated through the waveguide is diffracted by an elastic surface wave 18 produced from a combtooth-like electrode 13 and becomes a deflected light 16. This deflected light 16 and O-order light 17 not deflected by the elastic surface wave 18 emerge from the waveguide through a prism coupler 19.

Turning back to FIG. 1A, the deflected light 7 having emerged from the light deflector 1 is transmitted through the beam splitter 2 and is converged on the recording medium 6 on which information is recorded, by the objective lens 3. The signal light 8 reflected from the recording medium 6 while being subjected to modulation in accordance with the aforementioned information is separated from the deflected light 7 by the beam splitter 2 and is imaged on the light-receiving surface of the photodetector 5 by the condensing lens 4. The photodetector 5 detects the signal light 8 and reproduces the aforementioned information.

An information recording or reproducing apparatus using such a light deflector by diffraction has an excellent characteristic that high-speed scanning of the recording or reproducing light is possible. However, as shown in FIG. 1A, the apparatus according to the prior art is not provided with the focus control or tracking control function and therefore could not be intactly applied to an apparatus for effecting recording and/or reproduction of higher density, such as an optical disk apparatus or a magneto-optical disk apparatus.

SUMMARY OF THE INVENTION

It is an object of the present invention to provide an information processing method and apparatus in which when a light is applied to a recording medium to effect recording or reproduction of information, the light can be moved at a high speed on the recording medium and accurate focus control or tracking control of the light is possible.

Such object of the present invention is achieved by effecting, in an information processing method and apparatus wherein light deflected by diffraction is converged on the surface of a recording medium and information is recorded or reproduced, the focus control or tracking control of the deflected light on the surface of the recording medium by utilizing the O-order light in said diffraction.

BRIEF DESCRIPTION OF THE DRAWINGS

FIG. 13B-2 is similar to FIG. 13B-1 but with the beam entering the photodetector wider than that of FIG. 13B-1.

FIG. 13C-1 is similar to FIGS. 13B-1 and 13B-2 but shows the O-order light focus on the guide track and the beam symmetric relative to the guide track image.

FIG. 13C-2 is also similar but shows the O-order light focus deviated from the guide track.

DESCRIPTION OF THE PREFERRED EMBODIMENTS

Figure 1A:
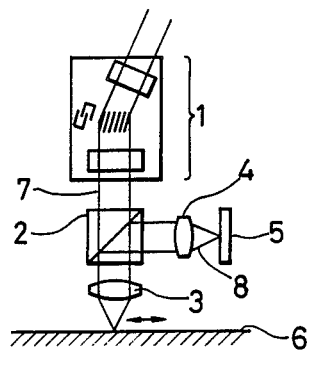
FIG. 1A is a schematic view showing a conventional information reproducing apparatus using the light deflector by diffraction.
Figure 1B:
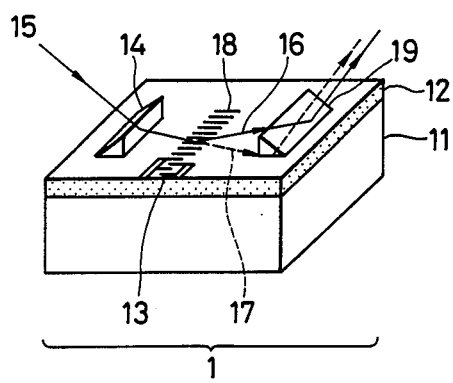
FIG. 1B is a perspective view showing the construction of the conventional light deflector by diffraction.
Figure 2:
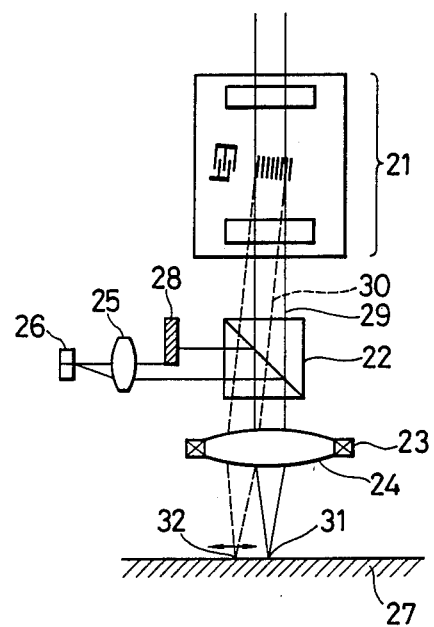
FIG. 2 is a schematic view showing a first embodiment of the information processing apparatus according to the present invention.

FIG. 2 is a schematic view showing a first embodiment of the information processing apparatus of the present invention. In FIG. 2, reference numeral 21 designates a light deflector using an elastic surface wave similarly to that shown in FIG. 1B, reference numeral 22 denotes a beam splitter, reference numeral 23 designates an objective lens driving device, reference numeral 24 denotes an objective lens, reference numeral 25 designates a condensing lens, reference numeral 26 denotes a two-division photodetector, reference numeral 27 designates a recording medium, and reference numeral 28 denotes a light-intercepting plate. In the case of such a light deflector using an elastic surface wave, +1st order diffracted light or −1st order diffracted light is used as the recording light and the reproducing light, but usually the efficiency of diffraction by the elastic surface wave is 100% or less and therefore, O-order light, i.e., non-diffracted light, is created. The present invention positively utilizes the O-order light to effect focus adjustment. That is, as shown in FIG. 2, the O-order light 29 and deflected light 30 having emerged from the light deflector 21 pass through the beam splitter 22 and are both imaged on the recording medium 27 by the objective lens 24.

The deflected light 30 is modulated in accordance with a recording signal and records information on the recording medium. On the other hand, during information reproduction, the deflected light 30 is caused to enter the recording medium and the reflected light from the recording medium is received by a photodetector, not shown, and the information recorded on the recording medium is reproduced. In this case, the photodetector for information reproduction is provided at such a size and position that the reflected light does not deviate from the light-receiving surface thereof; however, the light incident on the recording medium may be deflected by the light deflector.

Also, the reflected light of the O-order light 29 is directed toward the two-division photodetector 26 by the beam splitter 22.

In the case of the present first embodiment, the surface of the photodetector and the surface of the recording medium is in a conjugate relation with the deflected light 30, but since O-order light is utilized for the focus detection, as focus adjusting signal light (the reflected light of the O-order light by the recording medium) does not vibrate on the surface of the detector however deflected the deflected light may be. In this manner, the signal obtained by the two-division photodetector is fed back to the objective lens driving device 23 to move the objective lens in the direction of the optic axis, so that the focus 31 of the O-order light 29 becomes coincident with the surface of the recording medium 27. The above-described system premises that if, as shown in FIG. 2, the focus 31 of the O-order light 29 by the objective lens 24 is coincident with the surface of the recording medium, the focus 32 of the deflected light 30 by the condensing lens 25 is also coincident with the surface of the recording medium, but when the image plane position of the deflected light 30 differs from that of the O-order light 29, displacement of such position may be corrected and the objective lens driving device 23 may be driven.

Figure 3A:
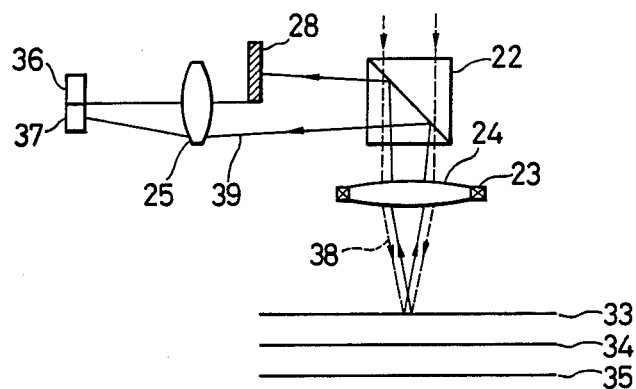
FIG. 3A illustrates the principle of focus detection in the first embodiment with the recording medium surface forward of the focus position of the O-order light.
Figure 3B:
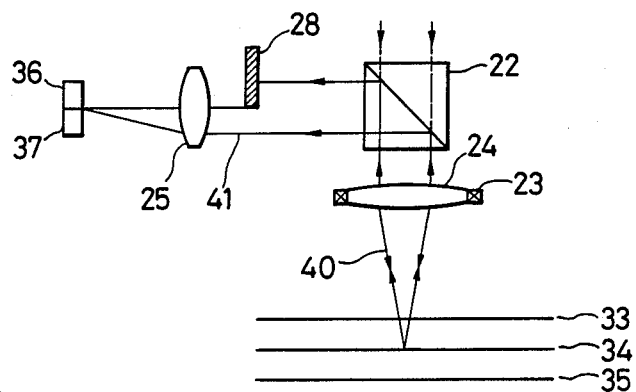
FIG. 3B is similar to FIG. 3A but illustrates the principle with the recording medium surface coincident with the focus position.
Figure 3C:
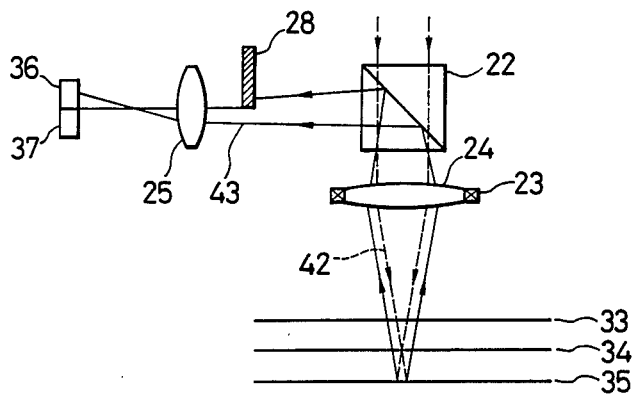
FIG. 3C is similar to FIGS. 3A and 3B but illustrates the principle with the recording medium surface rearwardly of the focus position.

Reference is now made to FIGS. 3A, 3B and 3C to describe the focus signal detecting method of the above-described embodiment. FIGS. 3A, 3B and 3C show the state of the reflected light of the O-order light from the surface of the recording medium by the difference in position between the objective lens 24 and the surface of the recording medium. Reference numeral 33 represents the medium surface when the recording medium lies forwardly of the focus position of the O-order light by the objective lens 24, reference numeral 34 represents the medium surface when the recording medium lies at the focus position of the O-order light, and reference numeral 35 represents the medium surface when the recording medium lies rearwardly of the focus position of the O-order light. When, as shown in FIG. 3A, the surface of the recording medium lies forwardly of the focus position of the O-order light by the objective lens, the reflected light 38 from the medium is made into a divergent light beam by the objective lens 24 and enters the beam splitter 22. The divergent light beam is bent toward the photodetector by the beam splitter 22 and one half of the divergent light beam is intercepted by the light-intercepting plate 28 with a result that the remaining light beam 39 is caused to enter one side 37 of the two-division photodetector by the condensing lens 25.

On the other hand, when, as shown in FIG. 3B, the surface of the recording medium is coincident with the focus position of the O-order light by the objective lens 24, the reflected light 40 from the medium is made into a parallel light beam by the objective lens 24 and enters the beam splitter 22. The parallel light beam is bent toward the photodetector by the beam splitter 22 and one half of the parallel light beam is intercepted by the light-intercepting plate 28 with a result that the remaining light beam 41 is imaged at the middle between the two-division photodetectors 36 and 37 by the condensing lens 25. On the other hand, when, as shown in FIG. 3C, the surface of the recording medium lies rearwardly of the focus position of the O-order light by the objective lens 24, the reflected light 42 from the medium is made into a convergent light beam by the objective lens 24 and enters one side 36 of the two-division photodetector due to a principle similar to that previously described.

Accordingly, if the objective lens driving device 23 is driven so that the difference between the signals obtained from the two-division photodetectors 36 and 37 is always zero, the focus of the 0-order light by the condensing lens 24 will be coincident with the surface of the recording medium. Such an in-focus signal detecting method is proposed, for example, in U.S. Pat. No. 4,357,085, but the present invention is also applicable to other focus detecting methods.

Figure 4:
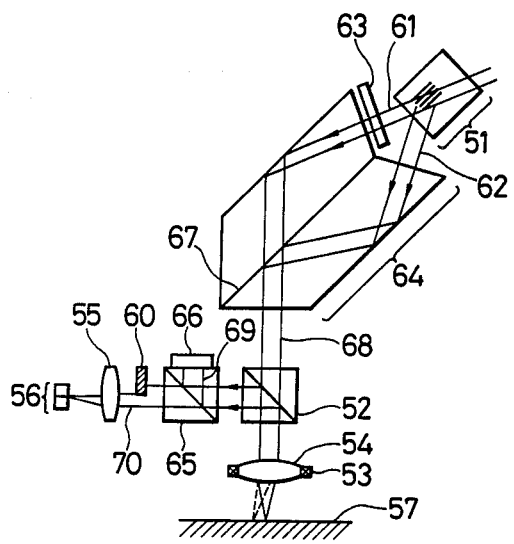
FIG. 4 is a schematic view showing a second embodiment of the present invention.

Reference is now made to FIG. 4 to describe a second embodiment of the information processing apparatus of the present invention. Reference numeral 51 designates a light deflector using an elastic surface wave, reference numeral 63 denotes a ½ wavelength plate, reference numerals 64 and 65 designate polarizing beam splitters, reference numeral 52 denotes a beam splitter, reference numeral 66 designates a photodetector, reference numeral 53 denotes an objective lens driving device, reference numeral 54 designates an objective lens, reference numeral 55 denotes a condensing lens, reference numeral 56 designates a two-division photodetector, and reference numeral 60 denotes a light-intercepting plate. The light deflector 51 comprises a planar type light waveguide structure as described in connection with FIG. 1B, and the polarized state of the light emerging from the light deflector is linear polarization. Assuming that the mode of waveguide light is TE mode, the direction of vibration of the electric field is within the plane of FIG. 4 with regard to both of the 0-order light 61 and the deflected light 62 emerging from the light deflector. The deflected light 62 enters the polarizing beam splitter 64 while keeping the above-described polarized state and on the other hand, the 0-order light 61 is converted into a linearly polarized light orthogonal to the above-mentioned deflected light by the ½ wavelength plate 63 and enters the polarizing beam splitter 64.

The deflected light 62 having entered the polarizing beam splitter 64 is totally reflected by a surface 67 in the polarizing beam splitter, and the 0-order light 61 and the deflected light 62 are combined together. The combined light 68 of the 0-order light 61 and the deflected light 62 is transmitted through the beam splitter 52 and is condensed on the recording medium 57 by the condensing lens 54. In the present second embodiment, the 0-order light can be condensed closely adjacent to the position at which the deflected light is condensed, and the focus of the deflected light can be made coincident with the recording medium more accurately. The aforementioned combined light 68 is reflected from the recording medium 57 and is caused to enter the polarizing beam splitter 65 by the beam splitter 22. The reproducing light 69 which is the reflected light of the deflected light is detected by the photodetector 66 and reproduces the information recorded on the recording medium 57. Also, the reflected light of the 0-order light is transmitted through the polarizing beam splitter 65, and part of such reflected light is intercepted by the light-intercepting plate 60 as in the first embodiment, enters the two-division photodetector 56 and becomes a focus detection signal.

In the foregoing example, the case where the information recorded on the recording medium is optically read out and reproduced has been shown, but the deflected light may be modulated in accordance with an information signal by the use of a similar structure and applied to the recording medium, thereby providing an information recording apparatus.

Figure 5:
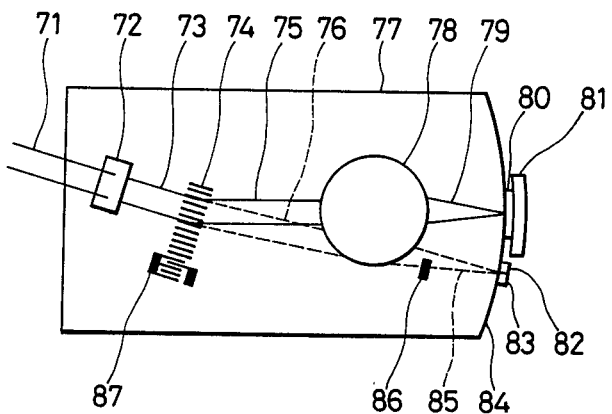
FIG. 5 is a schematic view showing a third embodiment of the present invention.

Reference is now made to FIG. 5 to describe a third embodiment of the information processing apparatus of the present invention. Reference numeral 72 designates a prism coupler, reference numeral 74 denotes an elastic surface wave, reference numeral 77 designates a light waveguide, reference numeral 78 denotes a variable focus type thin film lens which comprises a thin film lens formed of a substance having the electro-optic effect and an electrode for applying an electric field to the thin film lens and which adjusts the voltage applied to the electrode to thereby vary the focal length by the use of the electro-optic effect, reference numeral 80 designates an optical recording tape, reference numeral 81 denotes a pad for holding down the recording tape against the end surface 84 of the waveguide, reference numerals 82 and 83 designate two-division photodetectors, reference numeral 86 denotes a light-intercepting plate, and reference numeral 87 designates a tooth-like electrode for producing the elastic surface wave. A collimated laser beam 71 is directed into the waveguide 77 by the prism coupler 72. The waveguide light 73 is separated into 1st order diffracted light 75 and 0-order light 76 by the elastic surface wave 74 produced from the combtooth-like electrode 87. Both the 1st order diffracted light 75 and the 0-order light 76 enter the variable focus type thin film lens 78, and the 1st order diffracted light 75 is condensed on the end surface 84 of the waveguide like the recording waveguide light 79 and effects recording on the recording tape 81 which is in intimate contact with the end surface. On the other hand, the 0-order light 76, after having left the variable focus type thin film lens 78, is partly cut by the light-intercepting plate 86 and becomes a waveguide light indicated by 85, and enters the two-division photodetectors 82 and 83. Where the focus by the variable focus type thin film lens 78 lies inside the end surface 84 of the waveguide, the waveguide light 85 enters the two-division photodetector 83 and on the other hand, where the focus by the variable focus type thin film lens 78 lies outside the end surface 84 of the waveguide, the waveguide light 85 enters the two-division photodetector 82. If a voltage is applied to the electrode of the variable focus type thin film lens so that the difference between the signals obtained from the two-division photodetectors 82 and 83 is always zero, the recording waveguide light 79 is condensed on the end surface 84 of the waveguide.

The present third embodiment has the effect of achieving super-compactness by providing on the same waveguide the variable focus type thin film lens having no mechanical operating portion and the light deflector. Again in the present embodiment, an information reproducing apparatus can be constructed by providing means for detecting the light from the optical recording tape 80.

Figure 6:
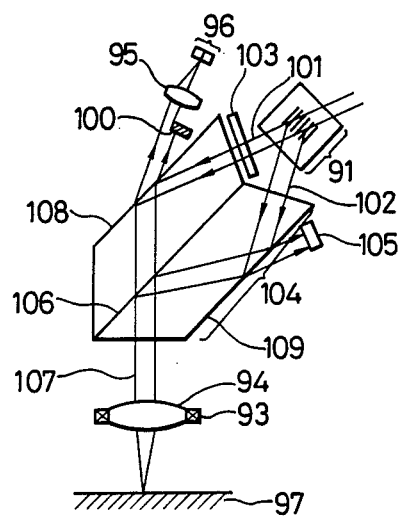
FIG. 6 is a schematic view showing a fourth embodiment of the present invention.

FIG. 6 shows a fourth embodiment of the information processing apparatus of the present invention. In FIG. 6, reference numeral 91 designates a light deflector using an elastic surface wave, reference numeral 93 denotes an objective lens driving device, reference numeral 94 designates an objective lens, reference numeral 95 denotes a condensing lens, reference numeral 96 designates a two-division photodetector, reference numeral 97 denotes a recording medium, reference numeral 100 designates a light-intercepting plate, reference numeral 103 denotes a ½ wavelength plate, reference numeral 104 designates a polarizing beam splitter, and reference numeral 105 denotes a photodetector.

Designated by 108 and 109 are half-mirror surfaces. Again in the present fourth embodiment, O-order light 101 and deflected light 102 are combined together on the surface 106 in the polarizing beam splitter 104 by a principle similar to that of the second embodiment. This combined light 107 is condensed on the recording medium 97 by the condensing lens 94. The reflected light of the aforementioned combined light returns to the polarizing beam splitter 104 and the O-order light component is transmitted through a surface 106 while, on the other hand, the deflected light component is reflected by the surface 106. The O-order light component is transmitted through the half-mirror surface 108, enters the two-division photodetector and becomes a focus detection signal, and on the other hand, the deflected light component is transmitted through the half-mirror surface 109, enters the photodetector 105 and becomes a reproducing signal.

In the foregoing example, the case where the information recorded on the recording medium is optically read out and reproduced has been shown, but the deflected light may be modulated in accordance with an information signal by the use of a similar construction and applied to the recording medium, thereby providing an information recording apparatus.

The present fourth embodiment, like the second embodiment, is capable of accomplishing highly accurate focus adjustment and has the effect that the optical system becomes simple as compared with the second embodiment.

Figure 7:
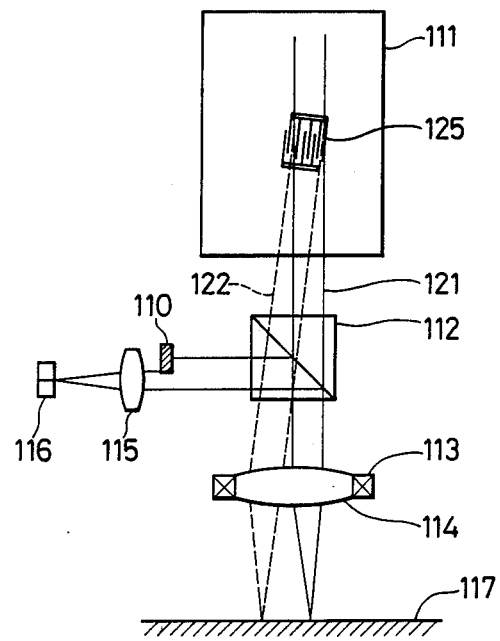
FIG. 7 is a schematic view showing a fifth embodiment of the present invention.

Reference is now made to FIG. 7 to describe a fifth embodiment of the information processing apparatus of the present invention. The first embodiment uses the acousto-optic effect for the light deflector, whereas in the present fifth embodiment, a thin film type light deflector using the electro-optic effect is used as the light deflector. Reference numeral 111 designates a light waveguide formed similarly to the example of FIG. 1B, and by applying a voltage to a combtooth-like electrode 65, the refractive index of the light waveguide is periodically varied and the incident light is defected by diffraction. The operation thereafter is just the sam as that of the first embodiment, that is, O-order light 121 and deflected light 122 are transmitted through a beam splitter 112 and are converged on the surface of a recording medium 117 by an objective lens 114, and recording or reproduction of information is effected by the deflected light. Also, the reflected light of the O-order light 121 by the recording medium 117 is partly intercepted by a light-intercepting plate 110 and is detected by a two-division photodetector 116 through a condensing lens 115, whereby a focus detection signal is obtained on the basis of a principle similar to that described in connection with FIG. 3. By driving an objective lens driving device 113 in accordance with this focus detection signal, the deflected light 122 is properly focused to the surface of the recording medium 117.

Figure 8:
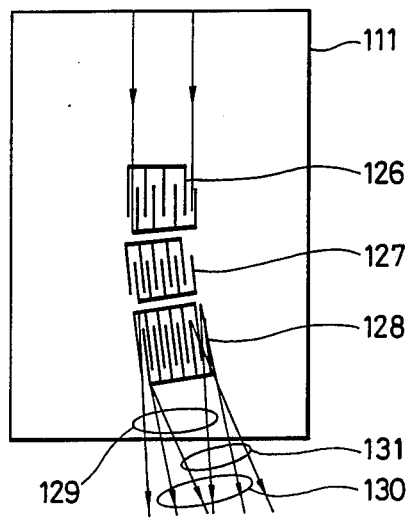
FIG. 8 is a schematic view showing a construction for making the deflection angle multiple in the light deflector of the fifth embodiment.

The deflection angle $2\theta$ in the aforementioned light deflector is given by the following equation:

$$2\theta = 2\sin^{-1}\left(\frac{\lambda}{2\Lambda}\right),$$

where $\Lambda$ is the pitch of the combtooth-like electrode and $\lambda$ is the wavelength of the incident light. The pitch of the grating now prepared was 8.8 μm, the logarithm was 350 pairs, and the intersection width was 3 mm. Also, to make the deflection angle multiple, as shown in FIG. 8, combtooth-like electrodes of different pitches may be prepared at inclinations matching the brag angles thereof. In FIG. 8, reference numerals 126, 127 and 128 designate combtooth-like electrodes of different pitches, reference numeral 129 denotes the deflected light by the electrode 126, reference numeral 130 designates the deflected light by the electrode 127, and reference numeral 131 denotes the deflected light by the electrode 128.

Figure 9:
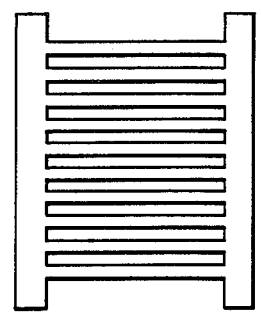
FIG. 9 shows the shape of an electrode when a light deflector utilizing the thermo-optic effect is constructed.

In the fifth embodiment, the electro-optic effect is utilized to create a grating structure in the light waveguide and deflection of the light is effected by diffraction, but alternatively, the thermo-optic effect may be utilized. In this case, the electrodes formed on the light waveguide similar to that of the fifth embodiment may be of a ladder type structure as shown in FIG. 9, and the material of the electrodes may be a heater material. The relation between the deflection angle and the pitch of the electrode is similar to that in the case where the electro-optic effect is used.

In the above-described embodiments, O-order light is utilized to effect the detection of the focus of the deflected light and effect the control of the focusing of this deflected light, but on the basis of the present invention, O-order light may be utilized to effect the detection of the applied position of the deflected light and effect the control of the tracking of this deflected light. An embodiment of such control of the tracking will hereinafter be described.

Figure 10:
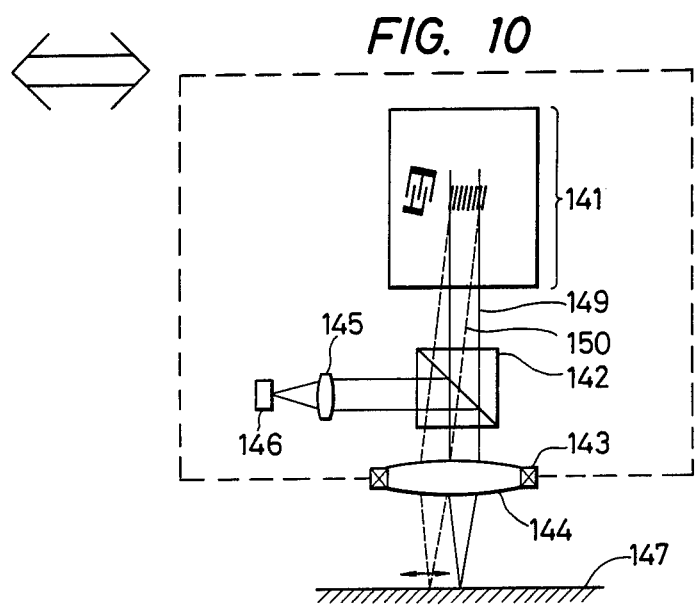
FIG. 10 is a schematic view showing a sixth embodiment of the present invention.

FIG. 10 is a schematic view showing a sixth embodiment of the information processing apparatus of the present invention. In FIG. 10, reference numeral 141 designates a light deflector using an elastic surface wave similarly to that shown in FIG. 1B, reference numeral 142 denotes a beam splitter, reference numeral 143 designates an objective lens driving device, reference numeral 144 denotes an objective lens, reference numeral 145 designates a condensing lens, reference numeral 146 denotes a six-division photodetector, and reference numeral 147 designates a recording medium.

In this embodiment, the O-order light is positively utilized to effect the detection of a tracking signal (i.e., a signal indicative of the relative position of the applied light and the track). That is, as shown in FIG. 10, the O-order light 149 and the deflected light 150 having emerged from the light deflector 141 pass through the beam splitter 142 and are both imaged on the recording medium 147 by the objective lens 144.

The deflected light 150 is modulated in accordance with a recording signal and records information on the recording medium. On the other hand, during the information reproduction, the deflected light 150 enters the recording medium and the reflected light from the recording medium is received by a detector, not shown, and reproduces the information recorded on the recording medium. The reflected light of the O-order light 149 is directed toward the six-division photodetector 146 by the beam splitter 142.

Again in the case of the present sixth embodiment, as in the example of the prior art, the surface of the photodetector and the surface of the recording medium are in a conjugate relation with the deflected light 150, but O-order light is utilized for the detection of the tracking signal and therefore, however deflected the deflected light may be, the control signal detecting light does not vibrate on the surface of the photodetector.

Figure 11:
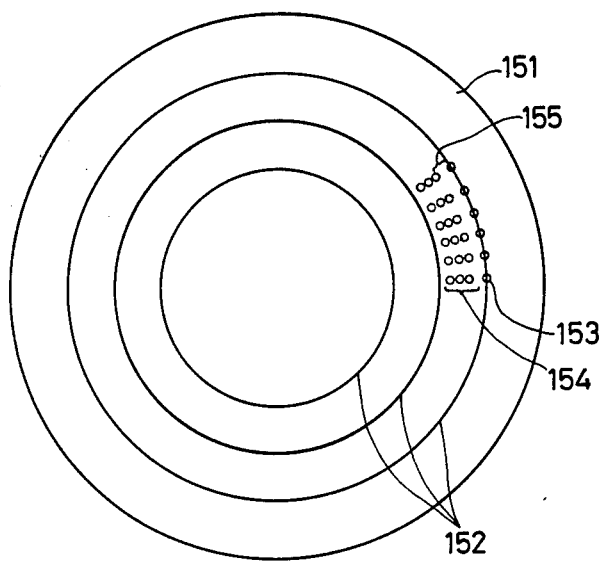
FIGS. 11 and 12 show the manner of information recording when the sixth embodiment is applied to an optical disk apparatus.

An information processing method using the above-described embodiment will now be described in greater detail. FIG. 11 shows a case where the recording medium is of a disk structure and recording or reproduction is effected while wobbling is applied by the light deflector of the above-described embodiment. In FIG. 11, reference numeral 151 designates a disk, reference numeral 152 denotes guide tracks for detecting the tracking signal by O-order light, reference numeral 153 designates reference signal bits on the guide track, and reference numeral 154 denotes signal bits written into the recording medium. During the information recording, the disk 151 is rotated and the signal bits 154 are written in the form of concentric circles or a spiral while the guide tracks 152 are traced by O-order light. Accordingly, during the information reproduction, the entire optical system of FIG. 10 is moved radially of the disk so that the O-order light is positioned on the guide tracks 152, whereby the deflected light scans on the signal bits 154 in the same manner as during the recording and the information is reproduced. The guide tracks may be provided in advance with the reference signals recorded as previously described or may be already recorded information tracks.

Figure 12:
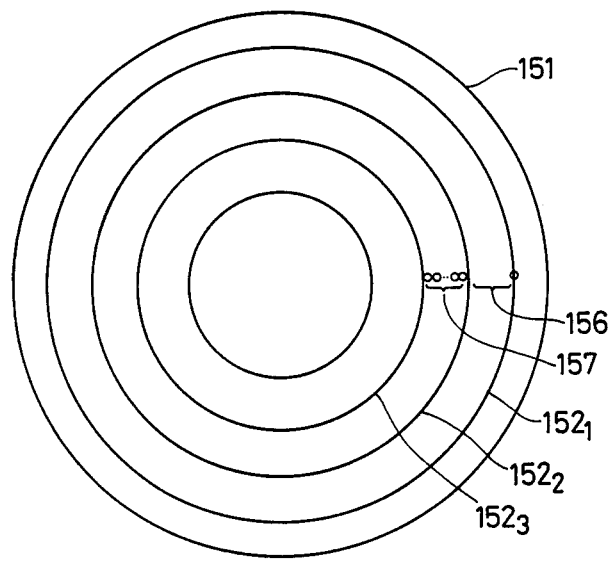

Generally, the deflected light is deflected with a certain angle of clearance relative to the direction of the O-order light. Therefore, as shown in FIG. 11, a clearance portion which cannot be used for the recording and reproduction is created between the guide tracks 152 and the signal bits 154. To effect the recording or the reproduction without creating such a clearance portion, the sweeping zone of the frequency of the light deflector may be set so that the clearance portion 156 and the width of a recording area 157 may be equal to each other as shown in FIG. 12, and the information between the guide tracks $152_2$ and $152_3$ may be recorded or reproduced by the deflected light while the guide track $152_1$ is traced by the O-order light.

In the foregoing, the case where information is recorded or reproduced along the guide tracks has been described, but for example, by rapidly scanning the light deflector each time the O-order light reproduces the reference signal bit while tracing the guide tracks by the O-order light, it is also possible to record signals radially between the guide tracks or to reproduce the radially recorded signals.

Figure 13A:
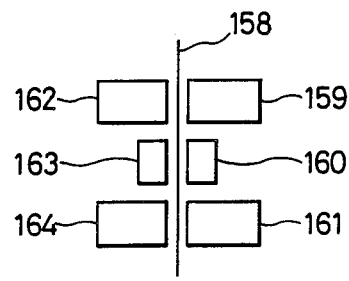
FIG. 13A illustrates the principles of focus detection and tracking detection in the sixth embodiment using a six division photodetector.
Figures 1, 2, 13B:
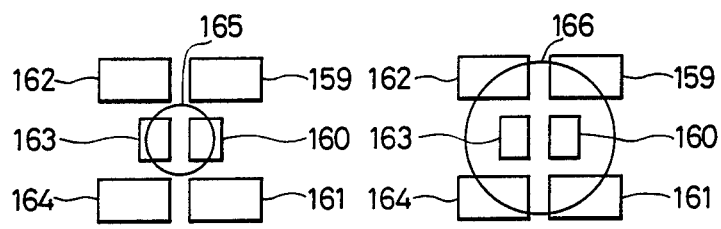
FIG. 13B-1 is similar to FIG. 13A but with the objective lens focus coincident with the recording medium.

To realize the aforedescribed information processing method, there is required a control system for causing the locus of the O-order light on the disk 151 when the disk is rotating to be coincident with the guide tracks 152. The structure of a six-division photodetector which enables such control to be accomplished and a method of detecting the control signal will hereinafter be described by reference to FIGS. 13A–13C-2. FIG. 13A shows the structure of the six-division photodetector. In this Figure, reference numerals 159, 160, 161, 162, 163 and 164 designate the light-receiving portions of the photodetector, and reference numeral 158 denotes a guide track image. The direction of the six-division photodetector is determined so that, as shown in FIG. 13A, the guide track image 158 lies in the middle of the light-receiving portions 159, 160, 161, 162, 163 and 164 of the photodetector, and in the optical system shown in FIG. 10, this six-division photodetector is set at a position slightly short of the surface which is in a conjugate relation with the recording medium 147 by the objective lens 144 and the condensing lens 145, so that the intensity of the light entering the light-receiving portions 160 and 163 of the six-division photodetector may become maximum when the focus of the O-order light by the objective lens 144 is coincident with the recording medium. If the six-division photodetector is so set, in a case where the focus of the objective lens shown in FIG. 10 is coincident with the recording medium 147, the beam 165 entering the photodetector enters the light-receiving portions 160 and 163 of the six-division photodetector, as shown in FIG. 13B-1, and on the other hand, in a case where the focus of the condensing lens is not coincident with the recording medium 147, the beam 166 entering the photodetector becomes wider and enters the light-receiving portions 159, 160, 161, 162, 163 and 164 of the six-division photodetector, as shown in FIG. 13B-2. Accordingly, to effect control so that the focus of the objective lens 144 is coincident with the recording medium, the objective lens driving device 143 shown in FIG. 10 may be driven so that the difference between the sum of the quantities of light entering the light-receiving portions 160 and 163 and the sum of the quantities of light entering the light-receiving portions 159, 161, 162 and 164 is maximum.

Figures 1, 2, 13C:
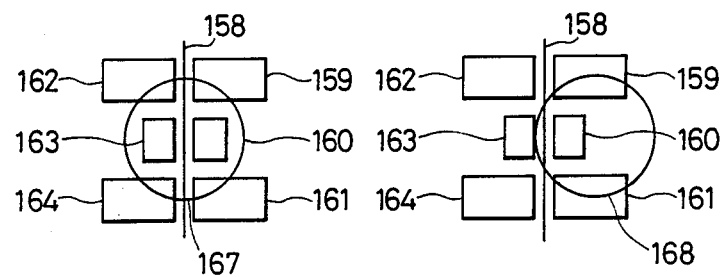

Also, where the focus of the O-order light lies on the guide track, the beam 167 entering the photodetector is symmetric with respect to the guide track image 158, as shown in FIG. 13C-1, and on the other hand, where the focus of the O-order light deviates from the guide track, the beam 168 entering the photodetector becomes asymmetric with respect to the guide track image 158, as shown in FIG. 13C-2. Accordingly, if the entire optical system of FIG. 10 is moved so that the difference between the sum of the quantities of light entering the light-receiving portions 159, 160 and 161 of the six-division photodetector and the sum of the quantities of light entering the light-receiving portions 162, 163 and 164 of the six-division photodetector is minimum, the focus of the O-order light will be positioned on the guide track.

Where the information recording or reproduction is realized by the method as described above, highly accurate tracking and accurate focus control become possible without being affected by the scanning of the deflected light by the light deflector.

Figure 14:
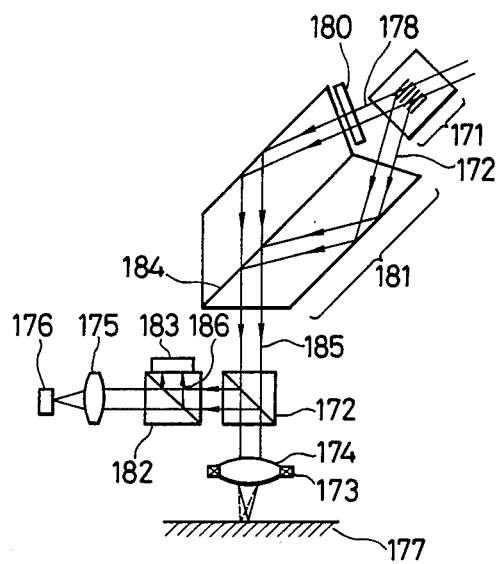
FIG. 14 is a schematic view showing a seventh embodiment of the present invention.

Reference is now made to FIG. 14 to describe a seventh embodiment of the information processing apparatus of the present invention. Reference numeral 171 designates a light deflector using an elastic surface wave, reference numeral 180 denotes a ½ wavelength plate, reference numerals 181 and 182 designate polarizing beam splitters, reference numeral 172 denotes a beam splitter, reference numeral 173 designates an objective lens driving device, reference numeral 174 denotes an objective lens, reference numeral 175 designates a condensing lens, reference numeral 183 denotes a photodetector, and reference numeral 176 designates a six-division photodetector. The direction and position of the six-division photodetector ar similar to those in the sixth embodiment. The light deflector 171, as described in connection with FIG. 1B, comprises a planar type light waveguide structure, and the polarized state of the light emerging from the light deflector is linearly polarized light. Assuming that the mode of the waveguide light is TE mode, with regard to both the O-order light 178 and the deflected light 179 emerging from the light deflector, the direction of vibration of the electric field is in the plane of FIG. 14. The deflected light 179 enters the polarizing beam splitter 181 while keeping the above-mentioned polarized state, and on the other hand, the O-order light 178 is converted into a linearly polarized light orthogonal to said deflected light by the ½ wavelength plate 180 and enters the polarizing beam splitter 181. The deflected light 179 having entered the polarizing beam splitter 181 is totally reflected by a surface 184 in the polarizing beam splitter, and the O-order light and the deflected light are combined together.

Figure 15:
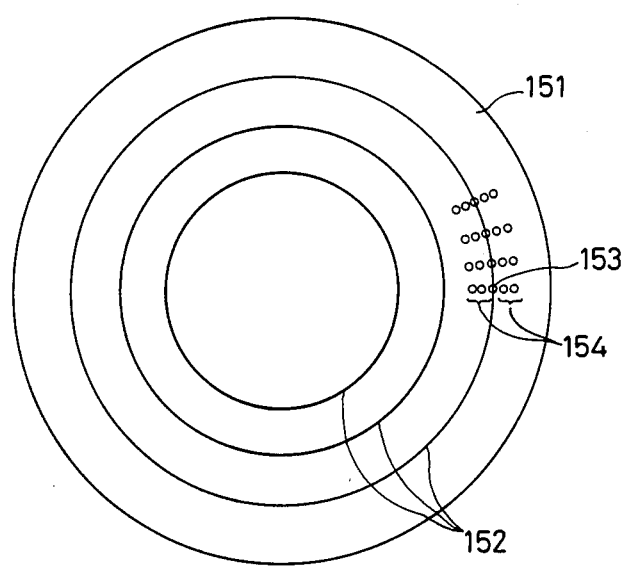
FIG. 15 shows the manner of information recording on a disk when the seventh embodiment is applied to an optical disk apparatus.

The combined light 185 of the O-order light and the deflected light is transmitted through the beam splitter 172 and is condensed on the recording medium 177 by the objective lens 174. The present seventh embodiment can condense the O-order light closely adjacent to the position at which the deflected light is condensed, and can accomplish the focus adjustment of the objective lens and the tracking with higher accuracy. FIG. 15 shows the reference signal bits and signal bits written on the disk recording medium by the use of the system of the present seventh embodiment. Similarly to FIG. 11, reference numeral 151 designates the disk, reference numeral 152 denotes guide tracks for detecting a tracking signal by the O-order light, reference numeral 153 designates the reference signal bits on the guide track, and reference numeral 154 denotes the signal bits written on the recording medium. In FIG. 15, the reference signal bits are written between the signal bits, whereas this is not restrictive but the reference signal bits may be provided at any position.

In FIG. 14, the combined light 185 is reflected from the recording medium 177 and enters the polarizing beam splitter 182 with the aid of the beam splitter 172. The detected light 186 which is the reflected light of the deflected light is directed to the photodetector 183 by the polarizing beam splitter 182 and the reflected light of the O-order light is transmitted through the polarizing beam splitter, enters the six-division photodetector 176 and becomes a focus control signal and a tracking signal due to a principle similar to that of the sixth embodiment.

In the seventh embodiment, the position at which the O-order light for detecting the focus control signal and the tracking signal is condensed is brought close to the position at which the deflected light which is the recording or reproducing light is condensed, whereby more accurate focus control and tracking control become possible.

Figure 16:
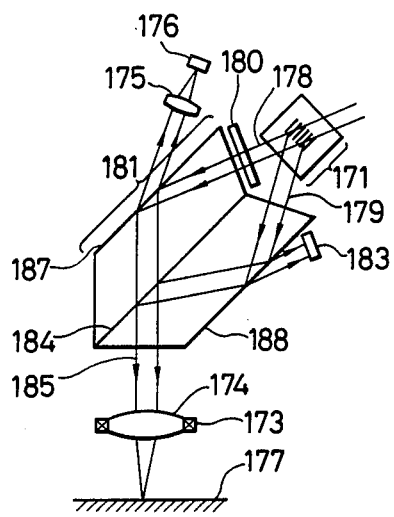
FIG. 16 is a schematic view showing an eighth embodiment of the present invention.

Also, as in the eighth embodiment of FIG. 16, the beam splitter 172 and the polarizing beam splitter 182 of the seventh embodiment may be omitted in construction. In FIG. 16, members similar to those of FIG. 14 are given common reference numerals and need not be described in detail. In FIG. 16, reference numerals 187 and 188 designate half-mirror surfaces. Again in the present eighth embodiment, the O-order light and the deflected light are combined together due to a principle similar to that of the seventh embodiment, and the combined light 185 is condensed on the recording medium 177 by the objective lens 174. The reflected light of the combined light returns to the polarizing beam splitter 181 and the O-order light component is transmitted through the surface 184 while, on the other hand, the deflected light component is reflected by the surface 184. The O-order light component is transmitted through the half-mirror surface 187, enters the six-division photodetector 176 and becomes a focus control signal and a tracking signal, while the deflected light component is transmitted through the half-mirror surface 188, enters the photodetector 183 and becomes a reproducing signal.

The present eighth embodiment has an advantage that the optical system is simple as compared with the seventh embodiment.

Figure 17:
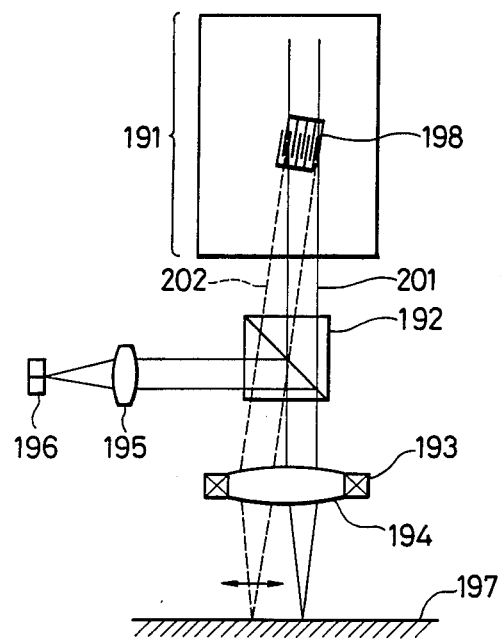
FIG. 17 is a schematic view showing a ninth embodiment of the present invention.

Reference is now made to FIG. 17 to describe a ninth embodiment of the present invention. In the aforedescribed sixth embodiment, the acousto-optic effect is used for the light deflector, whereas in the present ninth embodiment, the electro-optic effect is used for the light deflector. Reference numeral 191 designates a light waveguide formed similarly to the example of FIG. 1B. By applying a voltage to a combtooth-like electrode 198, the refractive index of the light waveguide is periodically varied and the incident light is defected by diffraction. The operation thereafter is just the same as that of the sixth embodiment, that is, the O-order light 201 and the deflected light 202 are transmitted through a beam splitter 192 and are converged on the surface of a recording medium 197 by an objective lens 194, and recording or reproduction of information is effected by the deflected light. Also, the reflected light of the O-order light 201 by the recording medium 197 is detected by a six-division photodetector 196 through a condensing lens 195, whereby a focus control signal and a tracking signal are obtained due to a principle similar to that described in connection with FIG. 13. By driving an objective lens driving device 193 in accordance with this focus control signal, the deflected light 202 is properly focused to the surface of the recording medium 197.

The deflection angle 2θ in the light deflector, as shown in the fifth embodiment, is given by the following equation:

$$2\theta = 2\sin^{-1}\left(\frac{\lambda}{2\Lambda}\right),$$

where $\Lambda$ is the pitch of the combtooth-like electrode and $\lambda$ is the wavelength of the incident light.

The pitch of the grating now prepared was 8.8 μm, the logarithm was 350 pairs, and intersecting width was 3 mm.

To make the deflection angle multiple in the present embodiment, as in the fifth embodiment, combtooth-like electrodes of different pitches may be made at an inclination matching the bray angles thereof, as shown in FIG. 8. Also, where O-order light is utilized to effect tracking control as shown in the sixth to ninth embodiments, use may be made of a light deflector which comprises an electrode formed of a heater material as shown in FIG. 9 and provided on the waveguide and which utilizes the thermo-optic effect.

The present invention is not restricted to the above-described embodiments, but various modifications are possible. For example, the light deflector is not restricted to the aforedescribed thin film type one but may be any one such as a bulk type one if it deflects light by the utilization of diffraction. Further, the present invention is applicable not only to optical disks and magneto-optical disks, but also to apparatuses in which image information is recorded on the surface of paper or a display surface by the scanning of converged light, such as laser beam printers or other image forming apparatuses and display apparatuses.

What is claimed is:

1. An information processing apparatus, comprising:
   a light deflector for deflecting light by utilizing diffraction;
   optical means for applying the deflected light and O-order light from said light deflector to a recording medium, said optical means applying the O-order light to guide track on the recording medium, applying the deflected light to data track locations and performing information recording or reproduction by said deflected light;
   detecting means for detecting the O-order light reflected by the recording medium and for obtaining a tracking signal; and
   adjusting means for controlling said optical means in accordance with said tracking signal to cause said O-order light to be applied to the guide track.

2. An apparatus according to claim 1, wherein said optical means includes means for making the directions of polarization of the deflected light from said light deflector and the O-order light orthogonal to each other, and a polarizing beam splitter for combining said O-order light and said deflected light whose directions of polarization are orthogonal to each other.

3. An apparatus according to claim 2, wherein said means for making the directions of polarization orthogonal to each other comprises a ½ wavelength plate provided in at least one optical path of said deflected light and said O-order light.

4. An apparatus according to claim 2, wherein the reflected light of said O-order light from said recording medium is separated from the reflected light of said deflected light by said polarizing beam splitter and is directed to said detecting means.

5. An apparatus according to claim 1, wherein said detecting means comprises a division photodetector having its light-receiving portion disposed symmetrically with respect to the guide track image of the reflected light.

6. An apparatus according to claim 1, wherein said light deflector is a thin film type light deflector utilizing the diffraction of light by an elastic surface wave.

7. An apparatus according to claim 1, wherein said light deflector is a thin film type light deflector utilizing variation in the refractive index of a light waveguide by an electro-optic effect.

8. An information processing method, comprising the steps of:
   deflecting light by utilizing diffraction and producing O-order light;
   applying the deflected light and the O-order light on a guide track on the recording medium and performing information recording or reproduction on the recording medium by said deflected light;
   detecting the O-order light reflected by the recording medium and obtaining a tracking signal; and
   adjusting the applied position of the deflected light and the O-order light on the recording medium in accordance with the tracking signal.

* * * * *

UNITED STATES PATENT AND TRADEMARK OFFICE
CERTIFICATE OF CORRECTION

PATENT NO. : 4,853,919

DATED : August 1, 1989

INVENTOR(S) : Mamoru Miyawaki, et al

It is certified that error appears in the above-identified patent and that said Letters Patent is hereby corrected as shown below:

On the title page:

COLUMN [56]

"Corsouer et al." should read --Corsover et al.--

IN THE DRAWINGS

Fig. 3C, delete reference numeral "42" and lead line.

COLUMN 1

Line 34, "U.S. Pat. No. 4,425,02" should read --U.S.Pat. No. 4,425,023,--.

COLUMN 4

Line 5, "as" should read --a--.

Line 64, delete reference numeral "42".

COLUMN 5

Line 52, "beam splitter 22." should read --beam splitter 52.--.

UNITED STATES PATENT AND TRADEMARK OFFICE
CERTIFICATE OF CORRECTION

PATENT NO. : 4,853,919

DATED : August 1, 1989

INVENTOR(S) : Mamoru Miyawaki, et al.

It is certified that error appears in the above-identified patent and that said Letters Patent is hereby corrected as shown below:

COLUMN 6

Line 18, "tooth-like" should read --combtooth-like--.

COLUMN 7

Line 41, "defected" should read --deflected--.
    Line 42, "sam" should read --same--.

COLUMN 8

Line 4, "brag" should read --Bragg--.

COLUMN 10

Line 60, "ar" should read --are--.

COLUMN 12

Line 17, "defected" should read --deflected--.
    Line 51, "bray angles" should read --Bragg angles--.

UNITED STATES PATENT AND TRADEMARK OFFICE
CERTIFICATE OF CORRECTION

PATENT NO. : 4,853,919

DATED : August 1, 1989

INVENTOR(S) : Mamoru Miyawaki, et al.

It is certified that error appears in the above-identified patent and that said Letters Patent is hereby corrected as shown below:

COLUMN 13

Line 10, "guide track" should read --a guide track--.

COLUMN 14

Line 13, "the" should be deleted.
Line 23, "a guide" should read --a recording medium, positioning the 0-order light on a guide--.

Signed and Sealed this

Thirty-first Day of July, 1990

Attest:

HARRY F. MANBECK, JR.

Attesting Officer

Commissioner of Patents and Trademarks